US006850785B1

(12) United States Patent
Leyten et al.

(10) Patent No.: US 6,850,785 B1
(45) Date of Patent: Feb. 1, 2005

(54) PORTABLE COMMUNICATION DEVICE ARRANGED FOR STATE-DEPENDENTLY CONTROLLING NON-UNIFORM SELECTION PATTERNS AMONG POSSIBLE ANTENNA DIRECTIVITY CONFIGURATIONS

(75) Inventors: Lukas Leyten, Eindhoven (NL); Peter J. Massey, Broadfield Crawley (GB); David Duperray, Le Mans (FR); Steven J. W. Van Lerberghe, Eindhoven (NL); Cyrille M. J. M. Amar, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/286,027

(22) Filed: Apr. 5, 1999

(30) Foreign Application Priority Data

Apr. 7, 1998 (EP) ........................................... 98400839

(51) Int. Cl.[7] ............................. H04B 1/38; H04B 1/10

(52) U.S. Cl. ................ 455/575.5; 455/63.4; 455/575.7; 343/702; 343/776; 343/840

(58) Field of Search .......................... 455/63.4, 83, 117, 455/129, 271, 274, 25, 73, 78, 82, 226.1, 269, 277.1, 272, 19, 13.3, 279.1, 575.1, 575.5, 575.7; 343/702, 776, 840, 841, 815, 817, 757, 764, 777, 828; 342/372, 419, 368, 457

(56) References Cited

U.S. PATENT DOCUMENTS

| | | | | | |
|---|---|---|---|---|---|
| 5,099,247 | A | * | 3/1992 | Basile et al. | 342/380 |
| 5,157,407 | A | * | 10/1992 | Omiya | 342/372 |
| 5,281,974 | A | * | 1/1994 | Kuramoto et al. | 342/372 |
| 5,298,906 | A | * | 3/1994 | Lantagne et al. | 342/372 |
| 5,303,240 | A | * | 4/1994 | Borras et al. | 455/25 |
| 5,335,366 | A | * | 8/1994 | Daniels | 455/575.5 |
| 5,559,806 | A | * | 9/1996 | Kurby et al. | 455/13.3 |
| 5,610,617 | A | * | 3/1997 | Gans et al. | 342/372 |
| 5,826,201 | A | * | 10/1998 | Gratias | 455/575.5 |
| 5,864,316 | A | * | 1/1999 | Bradley et al. | 342/372 |
| 5,983,119 | A | * | 11/1999 | Martin et al. | 455/575.7 |
| 6,095,820 | A | * | 8/2000 | Luxon et al. | 343/702 |

* cited by examiner

*Primary Examiner*—Simon Nguyen
(74) *Attorney, Agent, or Firm*—Dicran Halajian

(57) ABSTRACT

A portable communication device has an antenna configuration that allows to form various different antenna directivity configurations. In particular, a control device discriminates between a transmitting state and a receiving state of the communication device. As based thereon, it effects various non-uniform selection patterns among the directivity configurations.

18 Claims, 4 Drawing Sheets

PORTABLE COMMUNICATION DEVICE ARRANGED FOR STATE-DEPENDENTLY CONTROLLING NON-UNIFORM SELECTION PATTERNS AMONG POSSIBLE ANTENNA DIRECTIVITY CONFIGURATIONS

BACKGROUND OF THE INVENTION

The invention relates to a device and method for controlling antenna patterns of a portable communication device. Such portable devices, in particular mobile phones, have become a household word. In operation, such devices generally communicate with a remote base station, of which the geographical location will not be known a priori. Systems have been used with cellular terrestrial base stations, as well as with satellites. A first operational parameter of such system is the electromagnetic field strength from the base station at the position of the mobile phone. A second parameter is the principal direction of the received field vector; this indicates an apparent origin direction of the base station, which through various environmental causes may differ from the real origin direction. Optimum reception depends on this orientation relative to the antenna reception sensitivity pattern. A third parameter is the principal axis of the emitted field vector from the phone itself. Optimum reception of the transmitted signals in both directions requires that the origin direction and the principal axis should coincide with each other, and also regarding an optimum viz à viz antenna configurations. Another wish is that radiation emitted by the device should as much as possible be directed away from the head or other relevant part of a human user, or other nearby absorbing physical matter or obstacles during actual operation of the phone. Depending on the orientation of the device, certain ones of the above requirements may be in conflict.

SUMMARY TO THE INVENTION

In consequence, amongst other things, it is an object of the present invention to exclude or at least defer during an actual transmitting state the usage of one or more operation modes that would send major amounts of energy towards such physical matter or obstacles. Now therefore, according to one of its aspects, the invention includes a portable communication device having a control device that includes a detector for discriminating between a transmitting state and a receiving state of the communication device, and based on such states, effecting various non-uniform antenna patterns. The non-uniform selection patterns may imply that certain directivity configurations are forbidden in a particular state, in particular in a transmitting state. Another implementation is that the sequence in which the various directivity patterns are suggested to a user depends on the state of the device. A further implementation is that "bad" pattern may only be called for by a user through overruling a standard selection procedure. A still further implementation has a "bad" pattern attenuated by a certain factor. The transmitting state is usually restricted to an actual communication session. Alternatively, outside such session the device may periodically send brief signals to enable a set of base stations to track the changing position of the device au it may cross through various cells of a cellular system. A receiving state may either generally prevail only outside such session, or during a communication session alternate on the basis of utterances produced by a user.

A secondary object of the invention is to indicate to a user possible changes to be made to the device orientation that would reconcile the earlier requirements to a relatively high degree. The indication would show explicitly or implicitly to a user an optimum orientation of the device, such as by pointing to where the received energy comes from.

The invention also relates to a mobile phone fulfilling the above functions. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
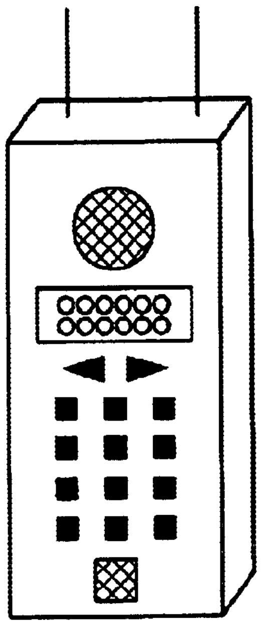
FIG. 1, a sketch of a portable telephone.

FIG. 1 is a sketch of a portable communications device executed as a mobile telephone according to the invention. Another embodiment could be a notebook or similar computer device. In principle, such device may allow to transfer other kinds of information than speech. As shown, the device has the general form of an elongate block, and has been provided with a loudspeaker (top), an alphanumerical display, a standard 12-key keyboard, a microphone (bottom), and two antennae.

Figure 2:
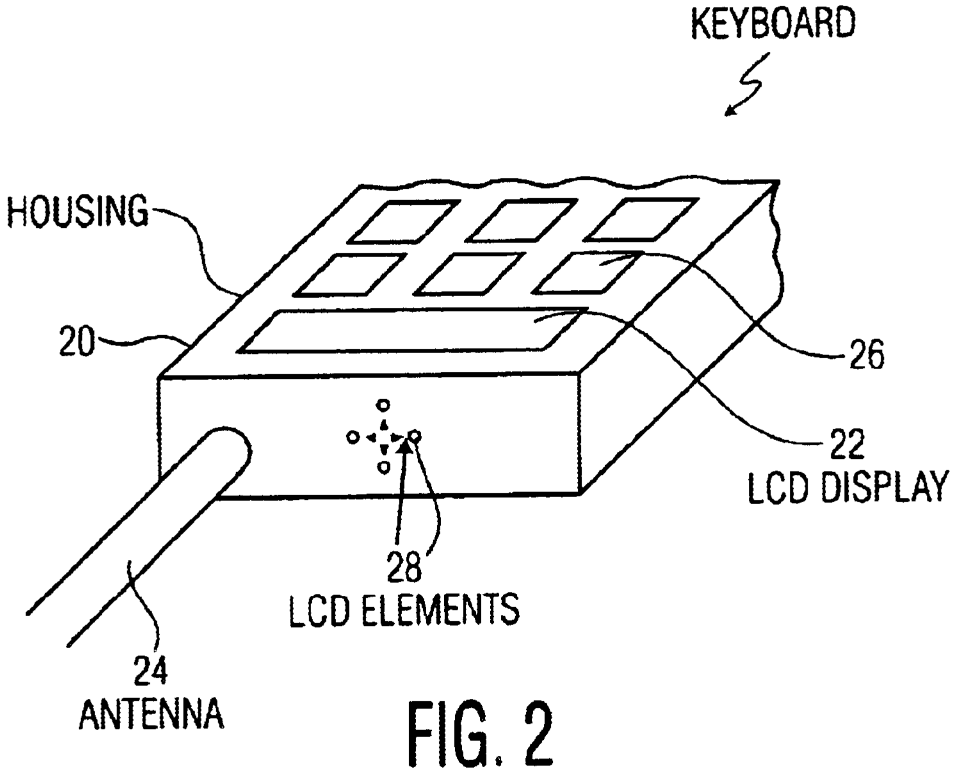
FIG. 2, a sketched device according to the invention.

FIG. 2 is another sketch of a device according to the invention. The device has a housing 20 with generally rectangular sides, although this is not a restriction. Various conventional features are external antenna 24, LCD display 22, and 3×4 keyboard 26. For brevity, further features that are irrelevant to the invention have been ignored. The device side opposite the keyboard now contains speech I/O devices not shown, in particular a small loudspeaker and a microphone, that have been located and configured in conformance to the general shape and size of a human head. In operation, a user should keep this side against the head, with the elements in question of the device close to ear and mouth, respectively. When not used, the device may be put anywhere, but will often be put down on a table or similar surface, such as in the case of a notebook. In the case of a telephone, the device could be put into a jacket pocket or similar place. Furthermore, the top side of the device contains four small LCD or similar elements 28 positioned according to a cross-like configuration. During an actual communication session, the lighting of the respective elements will indicate an apparent origin direction of the field received from the actual base station in question when projected on the plane of this side of the device. The illumination may be done as follows: each quadrant is divided into three equal parts of 30°. When the origin is less than 30° from a particular coordinate direction, only the LCD element of that direction will light up. When the direction is between 30° and 60° from two adjacent coordinate directions, the LCD elements of both associated coordinate directions will light up. Usually, the antenna configuration is such that reception will be optimum when the above projection is substantially perpendicular in the direction of the side that contains the keyboard. Quality variation when rotating around an axis perpendicular to the left/right sides in the Figure could be substantially less. If the lighting pattern would indicate otherwise, a user could improve reception quality or a feasible reception range through rotating the device.

Different technology may be used to show optimum orientation. A dedicated acoustical indicator such as noise or beep may be gradually suppressed or amended in another manner when approaching a "good" orientation. The indication may be output by the normal speech channel. Another simple feature is a red LED in sub-optimum situations and a green LED at near-optimum. Similarly, a bar made up of a plurality of green and/or red LEDs may be used to quantify the favourability of a particular orientation.

FIGS. 3A–E are polar diagrams of various antenna directivity configurations to be realized through two rod-type antennae that send or receive particular frequencies and/or phases of an electromagnetic wave. Each antenna operates substantially as a monopole. Certain directivity configurations have a general shape of a figure eight, either symmetric or not. Other configurations have three lobes, of which two lobes may be almost fused, and the third one be relatively small. Still further configurations may be effected by raising the number of parallel antenna rods, that need not all get the same power amplitude. A still different addition is a passive shield "at the rear side", which produces an emission pattern that is relatively strong at the "front side".

Figure 4A:
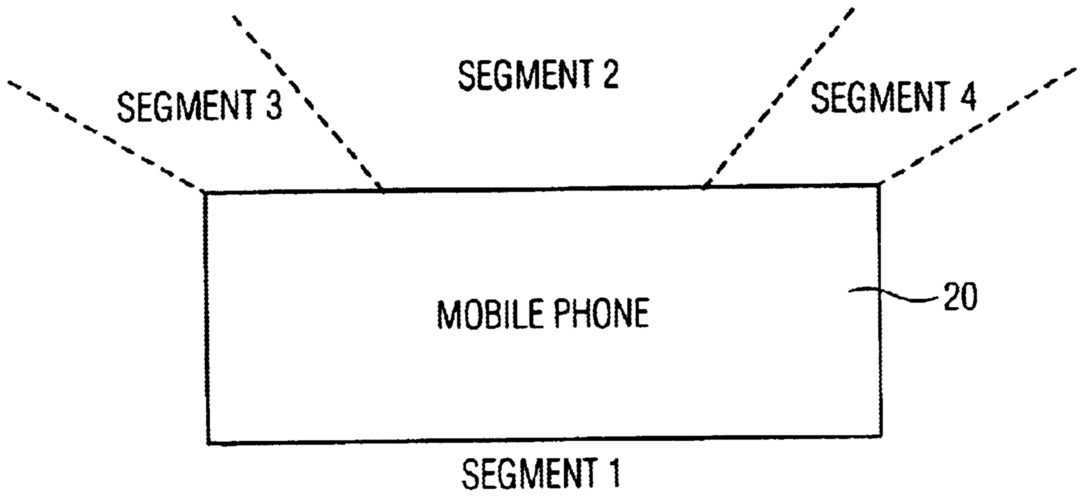
FIG. 4A, spatial segmenting of the device surroundings.

FIG. 4 shows spatial segmenting of the device surroundings with its cross-section shown as seen from the "top" side. The transmission space has been divided into four segments. Segment 1 roughly covers the position of a user's head, plus a certain tolerance region. Preferably, when the device is being held against a user's head, such as during an actual telephone conversation, relatively little radiation energy should be emitted in the solid angle associated with this segment: only little energy may then be absorbed.

Segment 2 is thus generally directed away from the user's head during conversation, and therefore contains the preferred solid angle for emitting radiation towards a base station. Segments 3 and 4 lie in between, and in consequence, would represent a compromise. It is known art to design an antenna in such manner that the radiation is preferably emitted within a certain solid angle of prescribed size and orientation; the patterns of FIGS. 3A–E are exemplary. Other objects or physical matter could be relevant for deciding on a particular antenna directivity configuration, such as a physical table on which the device is laid down when not in use, or other parts of a human body when the device would be incorporated, for example, into a notebook-sized computer device.

Figure 3A:
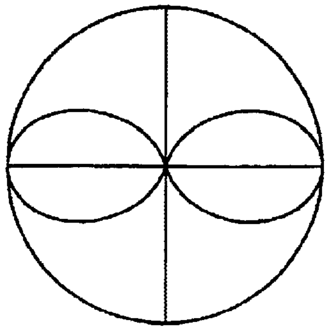
FIGS. 3A–E, various antenna directivity configurations.
Figure 3B:
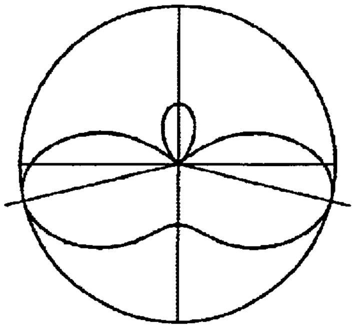
Figure 3C:
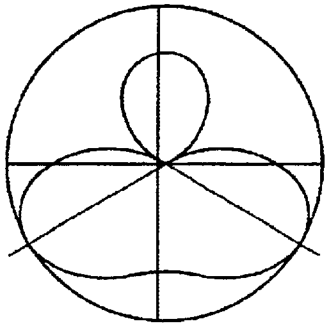
Figure 3D:
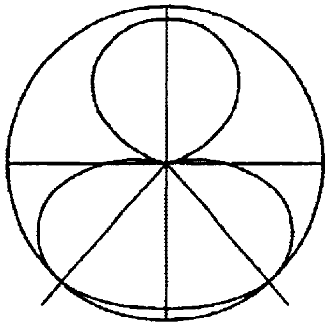
Figure 3E:
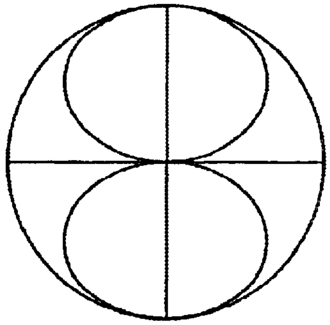
Figure 4B:
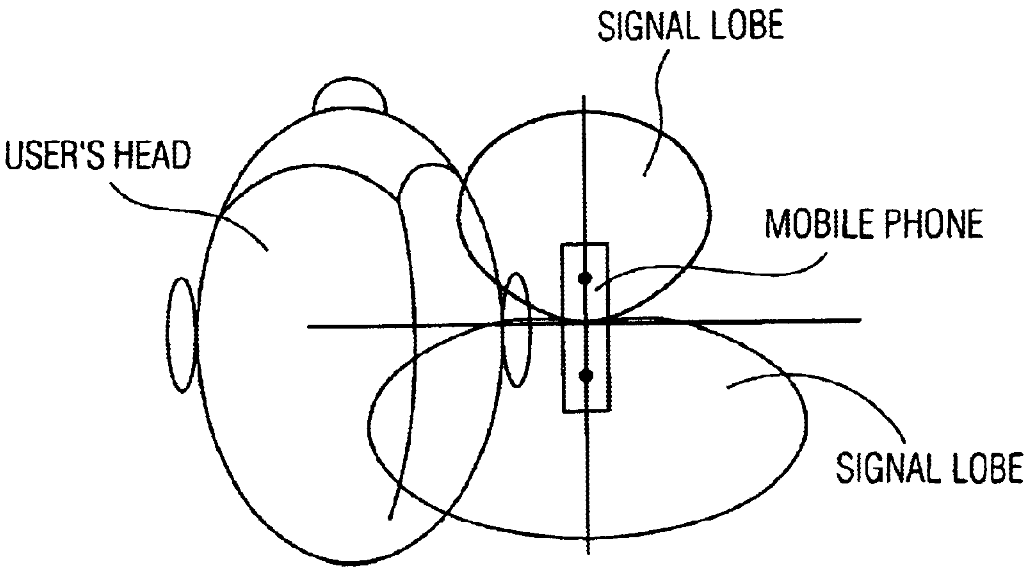
FIG. 4B, a typical field configuration during use.

FIG. 4B shows a typical field configuration during use, with a human head seen from the top, the device proper shown as a block, and a directivity pattern roughly conforming to FIG. 3D. Even with this elementary pattern, much of the energy is radiated away from the human head.

Figure 5:
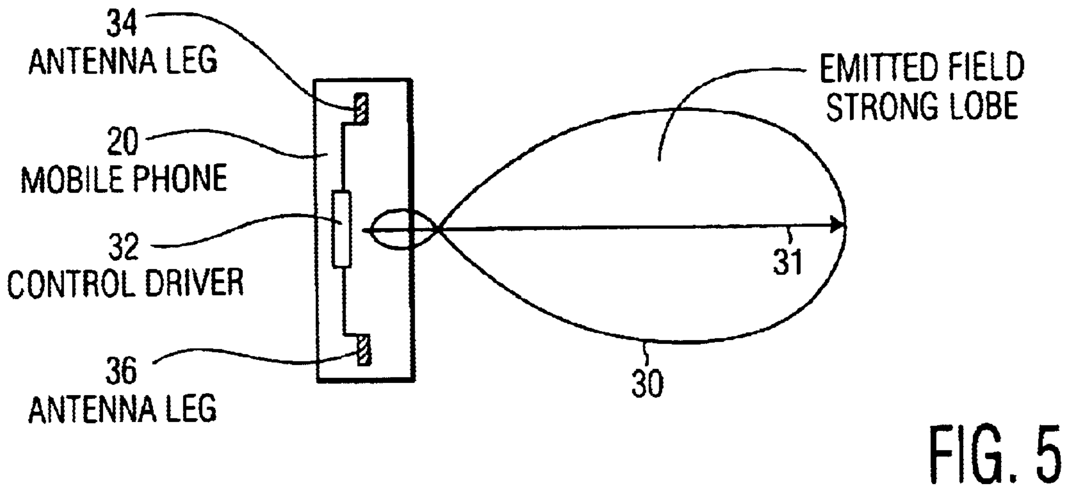
FIG. 5, an emissive field strength pattern.

FIG. 5 shows an emissive field strength pattern. Within the device 20, that has been projected from the same side as in FIGS. 1, 2, there have been shown antenna legs 34 and 36, and a control driver 32. Through relative timeshifting between the driving signals to the two antenna legs, and possibly, by the specific shaping of such signals in combination with an appropriate antenna geometry, it is possible to impart to the emitted field a polar pattern such as shown through curve 30 that has a strong lobe horizontally to the right away from the head, a much weaker lobe to the left, and still less energy in the vertical direction. If the apparent direction to the base station is now along arrow 31, reception of the telephone signals in the base station will be optimal. This may lead to energy saving through lower transmission power. Various other geometries of the emitted power may be likewise advantageous.

In similar manner a receiving antenna may have an optimum sensitivity in a particular direction. Furthermore such receiving antenna may have a shape that makes it possible to detect an apparent position of the base station with respect to an actual device orientation, for indicating on elements 28 in FIG. 2.

Figure 6:
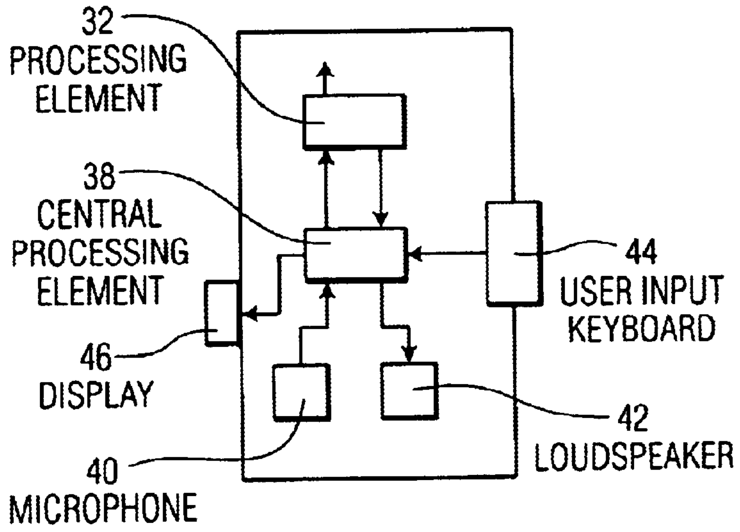
FIG. 6, an internal device block diagram.

FIG. 6 is an internal device block diagram. For brevity, the antenna configuration has not been shown, but from a conceptual point of view it may be connected to a similar processing element 32, that in fact may be dual purpose. Element 32 delivers to central processing element 38 the antenna signals received, so that the relative orientation of the base station may be calculated. This orientation will then be displayed on element 46 that represents the LCD elements 28 in FIG. 2. Furthermore, received antenna signals are converted into control signals for internal management of the telephone device, as well as into speech and possibly other signals, such as beeps or lights, for outputting on loudspeaker 42. Also, speech received on microphone 40 is converted into antenna signal modulation for transfer to the base station not shown for brevity. The user input keyboard has been symbolized by block 44, and may provide further input signals to element 38.

The above configuration of the telephone can display to a user an actual orientation, and implicitly suggest a better orientation of the telephone device. Furthermore the configuration will be able to position the output transmission energy either in the optimum direction for least absorption in the human head, or at least with a transmissive emission field substantially counter to the device side where microphone and loudspeaker are mounted. Another optimum could be determined with respect to the apparent orientation of the base-station. Furthermore, a time-out mechanism after termination of an actual call may signal the transmission energy to stop, and the reception field to switch to a more uniform angular sensitivity pattern. In fact, after termination of a call, a user may put the telephone in an arbitrary place, in which the orientation of the device either need no longer be controlled according to the above requirements, or may get another mode of operation as explained supra.

Various operational parameters of the device will improve through the above facilities that allow to position the device in an optimal orientation both with respect to the base station and with respect to a user's head. The total improvement is approximately 10 dB, which means a factor of 10 in necessary power, through the following aspects:

diversity gain: +6 dB better match of antenna to receiver electronics: +1.7 dB better efficiency of power amplifier: +0.3 dB less power absorbed by user's body: +3 dB.

Figure 7:
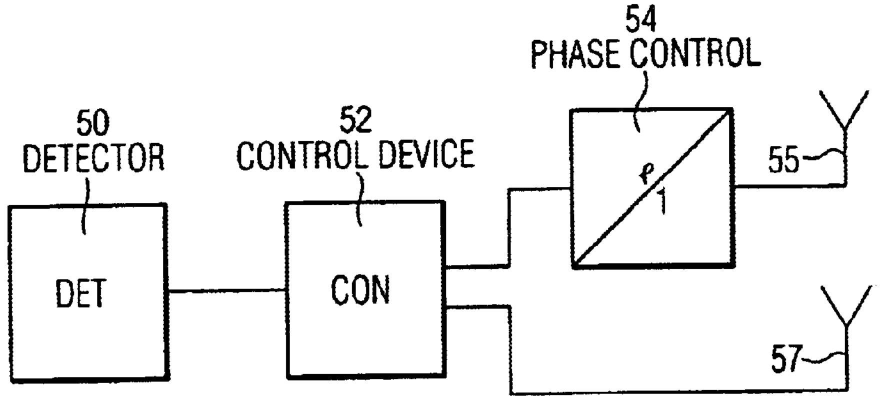
FIG. 7, an elementary phased array antenna.

FIG. 7 shows an elementary phased array antenna configuration. Two antennas 55, 57 get energy from control device 52. The transmission pattern will be controlled at least in part through the relative phases of these two antennas by phase control device 54. Element 50 is a detector that may detect a transmission state. This may be done either on the level of a communication session, taking into account that transmission and reception states may alternate regularly. Alternatively, transmission is detected per se, such as on the basis of speech actually received from a user. A third manner is through measuring mechanical motion, while considering that a human user during a communications session may impart specific motion patterns to the device.

What is claimed is:

1. A portable communication device comprising an antenna configuration connected to a control device for forming a plurality of different antenna directivity configurations, wherein said control device comprises detector means for discriminating between a transmitting state and receiving state of said communication device, for as based on such states effecting various non-uniform selection patterns among said plurality of said different antenna directivity configurations, wherein at least one of the patterns comprises first and second lobes, wherein the majority of the volume covered by the lobes does not intersect a user's head, and wherein the lobes define an axis that is substantially parallel to a direction the user is looking, the first lobe being on a side facing the direction and the second lobe being on an opposite aide, the first lobe being smaller than the second lobe, a gap between the lobes substantially coinciding with the user's ear.

2. A communication device as claimed in claim 1, wherein one or more directivity configurations are excluded from a particular selection pattern.

3. A communication device as claimed in claim 1, wherein one or more directivity configurations have non-uniform preferences in respective selection patterns.

4. A communication device as claimed in claim 3, wherein maid non-uniform preferences are subject to overruling by a user person.

5. A communication device as claimed in claim 1, wherein said transmitting state disfavours one or more directivity configurations that would expectably cause a relatively strong field absorbance in nearby physical matter.

6. A communication device au claimed in claim 1, wherein said control device is exclusively operational during an actual communication session.

7. A communication device as claimed in claim 1, comprising measuring means for measuring an apparent origin direction of a reception field and connected to indicator means for presenting a user indication as to said origin direction.

8. A communication device as claimed in claim 7, wherein said measuring device measures an actual reception signal strength for conversion into a parameter whose indicated value varies with a deviation from an optimum orientation.

9. A communication device as claimed in claim 7, wherein said user indication is acoustic and/or visual.

10. A communication device as claimed in claim 7, wherein said user indication is through a plurality of dispersively positioned discrete indicators.

11. A communication device as claimed in claim 1, comprising measuring means for in said device measuring an apparent origin direction of a reception field and connected to said control means for controlling a main axis of a reception sensitivity pattern along said apparent origin direction.

12. A communication device as claimed in claim 1 and executed as a mobile phone device and/or as a notebook computer device.

13. The device of claim 1 wherein the patterns effected are designed to minimize radiation directed toward the head of a user.

14. A method for protecting a user from radiation from a portable communication device, the method comprising performing the following operations within the device:

discriminating between a transmitting state and receiving state of the communication device, based on the state, selecting at least one non-uniform antenna directivity configuration from amongst a plurality of said configurations, forming the selected configuration such that, when the device is adjacent to the user's ear, radiation is mostly directed away from the user's body, wherein at least one of the plurality of said configurations comprises first and second lobes, wherein the majority of the volume covered by the lobes does not intersect a user's head, and wherein the lobes define an axis that is substantially parallel to a direction the user is looking, the first lobe being on a side facing the direction and the second lobe being on an opposite side, the first lobe being smaller than the second lobe, a gap between the lobes substantially coinciding with the user's ear.

15. The method of claim 14, further comprising detecting an apparent direction of a reception field.

16. The method of claim 14, further comprising providing an indication to the user that will help the user align the selected configuration in accordance with the reception field.

17. The method of claim 14, further comprising adjusting the selected configuration in accordance with the reception field.

18. The method of claim 17, wherein said adjusting is automated.

* * * * *